(12) United States Patent
Hutten et al.

(10) Patent No.: US 11,069,142 B2
(45) Date of Patent: Jul. 20, 2021

(54) USING LIVE FEEDS TO PRODUCE 1ST PERSON, SPATIAL, AND REAL LIFE VIEWS

(71) Applicant: Wormhole Labs, Inc., Huntington Beach, CA (US)

(72) Inventors: Curtis Hutten, Laguna Beach, CA (US); Robert D. Fish, Tustin, CA (US)

(73) Assignee: WORMHOLE LABS, INC., Huntington Beach, CA (US)

( * ) Notice: Subject to any disclaimer, the term of this patent is extended or adjusted under 35 U.S.C. 154(b) by 0 days.

(21) Appl. No.: 16/428,827

(22) Filed: May 31, 2019

(65) Prior Publication Data

US 2020/0380789 A1 Dec. 3, 2020

(51) Int. Cl.
*G06T 19/00* (2011.01)
*H04N 5/272* (2006.01)
*H04N 5/78* (2006.01)

(52) U.S. Cl.
CPC ........... *G06T 19/006* (2013.01); *H04N 5/272* (2013.01); *H04N 5/7805* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 9,747,080 B2 * | 8/2017 | Howard | G06F 8/20 |
| 2010/0026809 A1 * | 2/2010 | Curry | H04N 5/232 |
| | | | 348/157 |
| 2013/0057697 A1 | 3/2013 | Pace | |
| 2014/0240464 A1 * | 8/2014 | Lee | G01B 11/2545 |
| | | | 348/47 |
| 2015/0201134 A1 | 7/2015 | Carr | |
| 2015/0253974 A1 * | 9/2015 | Young | H04N 21/4126 |
| | | | 715/717 |
| 2017/0193709 A1 | 7/2017 | McArdle | |
| 2019/0182454 A1 * | 6/2019 | Berger | G06T 11/001 |

FOREIGN PATENT DOCUMENTS

| | | |
|---|---|---|
| KR | 20150076236 | 7/2015 |
| WO | 2018083668 A1 | 5/2018 |

OTHER PUBLICATIONS

Nvidia AI turns crude doodles into photorealistic landscapes, https://www.engadget.com/2019/03/20/nvidia-ai-doodles-photorealistic/, Apr. 4, 2019, 11 pages.
International search report dated Sep. 7, 2020, for related PCT application No. PCT/US20/35308. 12 pages.

* cited by examiner

*Primary Examiner* — Todd Buttram
(74) *Attorney, Agent, or Firm* — Fish IP Law, LLP

(57) ABSTRACT

A system or method includes a platform to allow users to coordinate images captured by a separated worn camera with images captured by a held camera, displaying such images at real-time to a user through a user interface on the held camera or a user interface on a separate device. The separate worn camera is contemplated to provide a separate image feed to provide one or more augmentations to an image captured by the held camera.

7 Claims, 4 Drawing Sheets

USING LIVE FEEDS TO PRODUCE 1ST PERSON, SPATIAL, AND REAL LIFE VIEWS

FIELD OF THE INVENTION

The field of the invention is mixed and extended reality environments.

BACKGROUND

The following description includes information that may be useful in understanding the present invention. It is not an admission that any of the information provided in this application is prior art or relevant to the presently claimed invention, or that any publication specifically or implicitly referenced is prior art.

Various efforts have been placed in providing users with a platform to send captured images and receive the captured images in users' mobile phone. Exemplary platforms include Skype talk and live lectures allow users to receive captured images on their mobile phone and computers.

These and all other publications identified in this application are incorporated by reference to the same extent as if each individual publication or patent application were specifically and individually indicated to be incorporated by reference. Where a definition or use of a term in an incorporated reference is inconsistent or contrary to the definition of that term provided in this application, the definition of that term provided in this application applies and the definition of that term in the reference does not apply.

There are instances in the prior art describing the use of captured images in US Patent Application Publication No. US 2010/0026809 A1 to Curry. Curry discloses a method of controlling a camera using a computer to track the movement of a particular subject in a sporting event. However, Curry fails to disclose a method of engaging a user in augmented reality with additional context and advanced image processing/tracking technologies applied. Curry merely discloses determining the position of a subject and switching cameras to cover the subject based on the subject coming into the field of view of one or more cameras in a venue.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. In this patent application, a camera is installed on a person or a object, and captured images by the camera were sent to and viewed by mobile phones and/or computers owned by the third party.

As another example, a lecture is recorded by a camera and sent to and viewed at real-time and/or later by a mobile phone and/or computer owned by the third party.

As used herein, "mixed reality" comprises the merging of real and virtual worlds to produce new environments and visualizations where physical and digital objects co-exist and interact in real time. Additionally and as used herein, "extended reality" comprises real-and-virtual combined environments and human-machine interactions generated by computer technology.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Unfortunately, the known platform use two camera at the different places, for example one is at a lecture room and the other is on a mobile phone. Thus, there is still a need for a system for coordinating separate worn and carried cameras on a single person.

SUMMARY OF THE INVENTION

The inventive subject matter provides apparatus, systems and methods for coordinating at least one separate worn camera and a carried camera on a single person. At least one worn camera is possessed by a person and images are captured by the worn camera. The captured images are viewed at real-time by the person in the presence of a mobile and/or a computer.

The position of the worn camera is adjusted according to the viewing direction. In some embodiments, the worn camera is set on the back of the person's head, allowing you to see views which are not possible to see by your eye sight, such that expand your eye sight limitation. In some embodiments, the focus range of the worn camera is different from the focus range of the person's eye, allowing to see more details of the object or very far from your position which are not possible to see, thereby augmenting the person's sense of sight. In some embodiments, a special filter, for example, an UV filter is installed on the worn camera, allowing the person to see the object which is not normally seen. In addition, the combination of some embodiments can be used for imaging.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based imaging system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the inventive subject matter provides a system or method that allows users to view images captured by a worn camera by use of a mobile phone and/or a computer. Some aspects of the inventive subject matter include a method of providing a system that enables people (e.g., the third party) to view environment surrounding the person at real-time and/or later, and/or to select the visible focusing range and the range of visible wavelength which are in the range of human eyes, such that expanding the sight capability.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
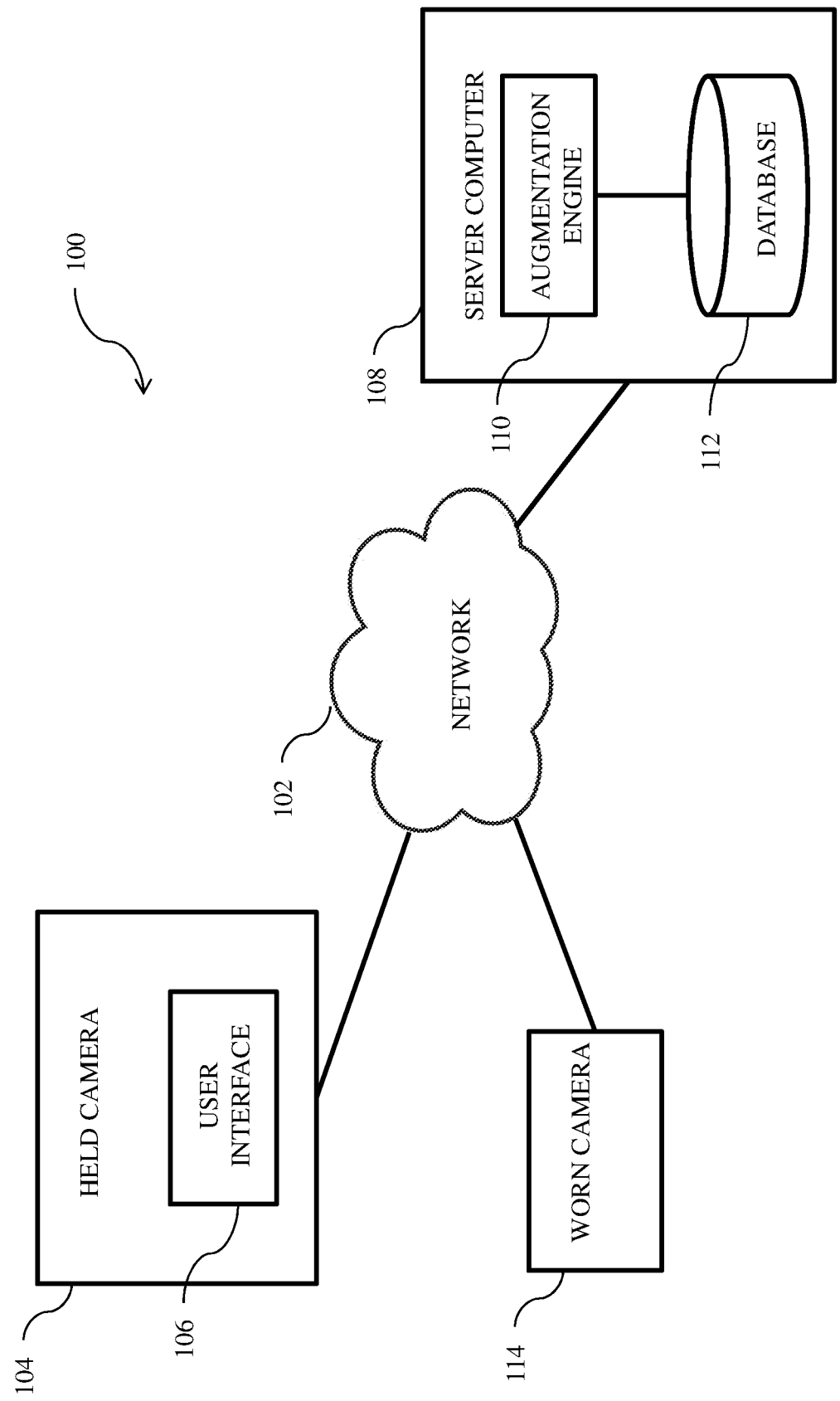
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes held camera 104, worn camera 114, and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between held camera 104, server computer 108, and any other computing devices (not shown) within distributed data processing environment 100.

It is contemplated that held camera 104 and worn camera 114 can be any programmable electronic computing devices capable of communicating with various components and devices within distributed data processing environment 100, via network 102. It is further contemplated that held camera 104 and worn camera 114 can execute machine readable program instructions and communicate with any devices capable of communication wirelessly and/or through a wired connection. As depicted, held camera 104 includes an instance of user interface 106. However, it is contemplated that any electronic device mentioned herein can include an instance of user interface 106.

User interface 106 provides a user interface to augmentation engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure augmentation engine 110 (discussed in more detail below) to enable a user to access a mixed reality space. It is contemplated that user interface 106 can allow a user to provide any information to augmentation engine 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by augmentation engine 110. In the depicted embodiment, augmentation engine 110 resides on server computer 108. However, database 112 can reside anywhere within a distributed data processing environment provided that augmentation engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
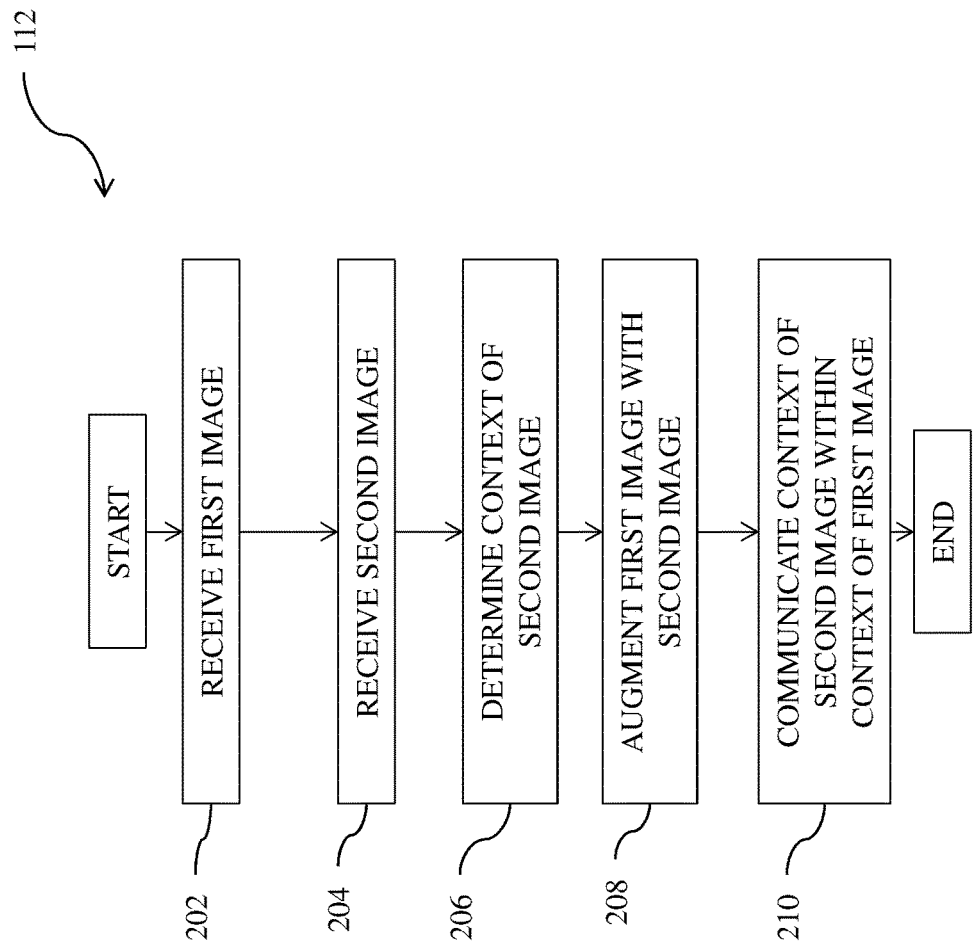
FIG. 2 is a schematic of a method of augmenting a first image by using a second camera to provide additional context.

FIG. 2 is a schematic of a method of enhancing situational context using a held camera and a worn camera.

Augmentation engine 110 receives a first image from a worn camera (step 202).

As used herein, worn camera 114 can comprise any imaging device that is capable of limited control.

In an exemplary embodiment, worn camera 104 is a small camera attached to a user's clothing to provide a substantially fixed perspective from a predesignated vantage point. For example, the predesignated vantage point can be limited to a camera pinned to a user's shirt and pointed substantially orthogonally relative to the surface of the user's chest.

In other embodiments, worn camera 114 may not be worn by a user. Instead, worn camera 114 can also include any one or more camera having limited user control. For example, worn camera 114 can include a 360 degree camera fixed in a user's room. In another example, worn camera 114 can be a network of cameras that record different fixed perspectives of the same environment. In yet another example, worn camera 114 can be augmented reality glasses with a built-in camera.

It is further contemplated that augmentation engine 110 receives an image from worn camera 114 in real-time. However, it is also contemplated that augmentation engine 110 can receive an image from worn camera 114 with a delay, including, for example, a 1 second, 10 second, or 1 minute lag.

Augmentation engine 110 receives a user second image from a held camera (step 204).

As used herein, held camera 104 can comprise any imaging device that is capable of independent control. In an exemplary embodiment, hand held camera 104 is a smart phone held by a user.

In another embodiment, hand held camera 104 is a camera held by someone other than the primary user. For example, hand held camera 104 can be a camera held by a camera operator to document the environment of the user in finer detail.

In other embodiments, hand held camera 104 does not have to be held physically, and instead, includes any camera that is independently controlled. For example, hand held camera 104 can be a non-autonomous, partially autonomous, and/or autonomous drone with a camera. In another example, hand held camera 104 can be a network of cameras recording various aspects of a subjects environment.

Augmentation engine 110 is not limited to static images, and can receive any one or more types of media data. For example, augmentation engine 110 can receive a photo. In another example, augmentation engine 110 can receive a video. In yet another example, augmentation engine 110 can receive a three dimensional mapping of an object. In a last example, augmentation engine 110 can receive enhanced imaging data, such as UV filtered images, to highlight environmental features that are outside of the visible spectrum for humans.

Augmentation engine 110 determines the context of the second image (step 206).

It is contemplated that augmentation engine 110 can determine the context of the second image in any manner known in the art.

In one embodiment, augmentation engine 110 receives the context of the second image directly from a user via user interface 106. For example, a user pointing a smart phone can input "water bottle" for a captured image of a water bottle using a touch screen user interface. In another example, a second individual can identify and input the context of the second image into augmentation engine 110.

In another embodiment, augmentation engine 110 determines the context of the second image using one or more analytical techniques. Analytical techniques are contemplated to include algorithms, including, for example machine learning algorithms. Machine learning algorithms can include any artificial intelligence based algorithms, including, for example, supervised learning classification, time series classification, and linear regression analysis.

For example, augmentation engine 110 can use a time series classification and a supervised learning classification to determine what the subject of an image is. Based on a determination that the image was taken at night during the month of December, augmentation engine 110 can narrow down the image to a list of 1000 potential objects. Using a supervised learning classifier, augmentation engine 110 can analyze the features of the image to determine which of the 1000 potential object match the visual features of the subject. Based on the combination of analyses, augmentation engine 110 can determine that the object in the photograph is a Christmas tree with twinkling lights.

In an alternative embodiment, augmentation engine 110 makes no determination about the context of the second image. For example, augmentation engine 110 can simply receive a particular photograph taken by the user and tied to a particular location and position. In this embodiment, it is contemplated that the second image can be provided to a user without context added (e.g., an image-based placeholder in an environment).

In some embodiments, augmentation engine 110 makes a determination about the context of an image based on crowd-sourced data. For example, augmentation engine 110 can allow a game streamer's followers to add tags relating to the context of one or more elements in the streamer's environment. Followers can identify the environment as "streamer's bedroom" and an award on the streamer's desk as a "Streamer of the Year" award from a popular gaming website. As more and more followers submit additional context to an environment, it is contemplated that augmentation engine 110 can provide more context to the environment over time. Additionally, the context can be updated by followers in substantially real-time, thereby keeping the context of the environment updated.

Augmentation engine 110 augments the first image with the second image (step 208).

Augmentation engine 110 can augment the first image with the second image in any manner known in the art.

In one embodiment, augmentation engine 110 automatically includes the context of the second image within the environment of the first image. For example, augmentation engine 110 can incorporate the context of every element in the first image simultaneously.

For example, augmentation engine 110 can automatically include a small screen in the top right corner of user interface 106 that shows a rear-view perspective from a worn camera 114 on the back of a user.

In another example, augmentation engine 110 can automatically include a zoomed in view of particular objects in a user's environment as the objects fall within the user's line of sight.

However, it is also contemplated that augmentation engine 110 can provide context in response to an action of the user. For example, the user can toggle various views, including, for example, rear-view and zoomed-in views, at their discretion, and augmentation engine 110 can provide context associated with one or more user inputs.

In other embodiments, augmentation engine 110 filters context of multiple second images associated with the environment of the first image to selectively display the contexts of particular sets of second images. For example, in response to a user toggling an option to only see context for mixed media arts, augmentation engine 110 can filter out all context associated with non-mixed art mediums (e.g., painting on canvas, sketch on paper, etc.).

In alternative embodiments, augmentation engine 110 filters the contexts of second images and also censors the first and/or second images to obfuscate the content. For example, in response to a viewer being 10 years old, augmentation engine 110 can automatically filter out context associated with alcohol and tobacco references. In another example, in response to a viewer's selection of interests, augmentation engine 110 can automatically focus on the most relevant context to the viewer's interests.

In a related example, augmentation engine 110 can censor particular second images based on the context associated with the second image.

Augmentation engine 110 communicates the context of the second image within the context of the first image (step 210).

Augmentation engine 110 can communicate the context of the second image automatically and/or manually.

In one embodiment, augmentation engine 110 automatically displays the context of the image. For example, augmentation engine 110 can automatically displays that an award in a subject's room is for participating in a college football championship game. Augmentation engine 110 can additionally include information about the stats of the subject during the season.

In a similar embodiment, augmentation engine 110 automatically displays the context of the second image in response to a trigger. In a virtual environment, for example, augmentation engine 110 can automatically display the context of an object within the environment, if a viewer pans their view of the environment to focus on the object and keeps their focus trained on the object for more than three seconds.

In another embodiment, augmentation engine 110 indicates elements in the environment of the first image are selectable to provide more context about each of the elements. For example, augmentation engine 110 can place a symbol over a number of objects in the environment of the first image that have additional context. Upon a user clicking a symbol above a subject's computer, augmentation engine 110 can produce a pop-up with additional information about the subject's computer specifications and games frequently played by the subject.

In yet another embodiment, augmentation engine 110 simultaneously displays the context of the second image and the first image. For example, augmentation engine 110 can be configured to always render background information about permanent art installments in an augmented reality tour of a museum.

Alternatively, augmentation engine 110 can cause a device to execute one or more actions instead of communicating the context of the second image within the context of the first image.

In one alternative example, augmentation engine 110 can cause held camera 104 to automatically take a picture when a target subject, as identified using worn camera 114, falls into view of held camera 104.

In another alternative example, a user can take a picture of an object using held camera 104 and send the captured image and associated metadata to augmentation engine 110. Augmentation engine 110 can then cause a fixed camera in a venue (worn camera 114) to shift its perspective to focus on the object in the picture.

In yet another alternative example, a user take a picture of a specific person in a venue using held camera 104 and send the captured image and associated metadata to augmentation engine 110. Augmentation engine 110 can then analyze one or more feeds from fixed cameras in the venue to identify and alert the user when the specific person falls into view of a fixed camera.

In another alternative embodiment, held camera 104 can be a mobile camera and worn camera 114 can be a stationary camera. For example, a searcher holding a smart phone can be on the ground looking in specific spots for a lost child, while a coordinator views a stationary camera/worn camera 114 showing a birds-eye view from above. The coordinator can direct the searcher to particular search areas while viewing what the searcher sees through a live feed from the smart phone/held camera 104.

Figure 3:
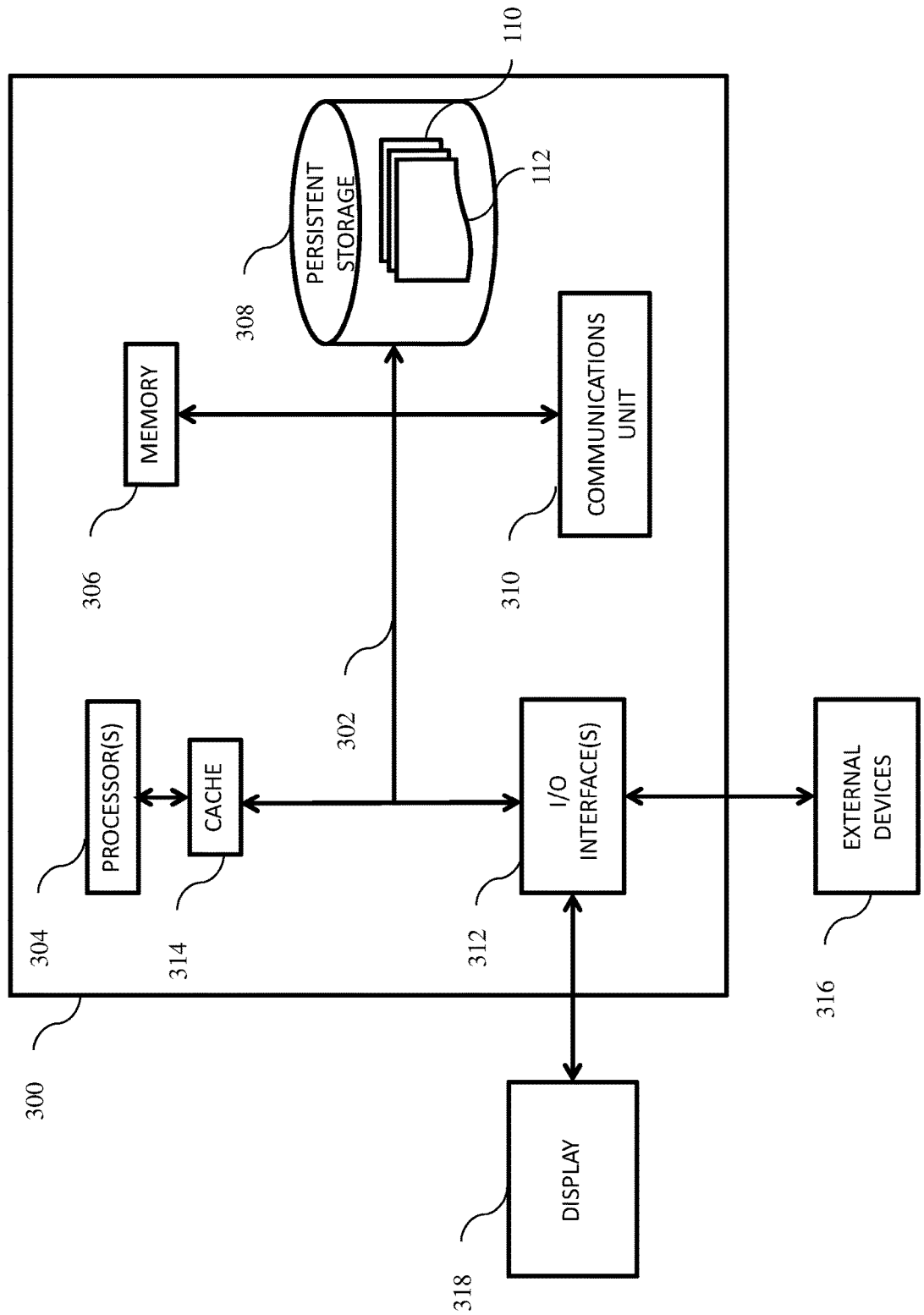
FIG. 3 depicts a block diagram of components of the server computer executing the mixed reality engine within the distributed data processing environment of FIG. 1.

FIG. 3 depicts a block diagram of components of the server computer executing augmentation engine 110 within the distributed data processing environment of FIG. 1. FIG. 3 is not limited to the depicted embodiment. Any modification known in the art can be made to the depicted embodiment.

In one embodiment, the computer includes processor(s) 304, cache 314, memory 306, persistent storage 308, communications unit 310, input/output (I/O) interface(s) 312, and communications fabric 302.

Communications fabric 302 provides a communication medium between cache 314, memory 306, persistent storage 308, communications unit 310, and I/O interface 312. Communications fabric 302 can include any means of moving data and/or control information between computer processors, system memory, peripheral devices, and any other hardware components.

Memory 306 and persistent storage 308 are computer readable storage media. As depicted, memory 306 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 306 and persistent storage 308 are random access memory and a hard drive hardwired to held camera 104, respectively. For example, held camera 104 can be a computer executing the program instructions of augmentation engine 110 communicatively coupled to a solid state drive and DRAM.

In some embodiments, persistent storage 308 is removable. For example, persistent storage 308 can be a thumb drive or a card with embedded integrated circuits.

Communications unit 310 provides a medium for communicating with other data processing systems or devices, including data resources used by held camera 104. For example, communications unit 310 can comprise multiple network interface cards. In another example, communications unit 310 can comprise physical and/or wireless communication links.

It is contemplated that augmentation engine 110, database 112, and any other programs can be downloaded to persistent storage 308 using communications unit 310.

In a preferred embodiment, communications unit 310 comprises a global positioning satellite (GPS) device, a cellular data network communications device, and short to intermediate distance communications device (e.g., Bluetooth®, near-field communications, etc.). It is contemplated that communications unit 310 allows held camera 104 to communicate with other computing devices 104 associated with other users.

Display 318 is contemplated to provide a mechanism to display information from augmentation engine 110 through held camera 104. In preferred embodiments, display 318 can have additional functionalities. For example, display 318 can be a pressure-based touch screen or a capacitive touch screen.

In yet other embodiments, display 318 can be any combination of sensory output devices, such as, for example, a speaker that communicates information to a user and/or a vibration/haptic feedback mechanism. For example, display 318 can be a combination of a touch screen in the dashboard of a car, a voice command-based communication system, and a vibrating bracelet worn by a user to communicate information through a series of vibrations.

It is contemplated that display 318 does not need to be physically hardwired components and can, instead, be a collection of different devices that cooperatively communicate information to a user.

Figure 4:
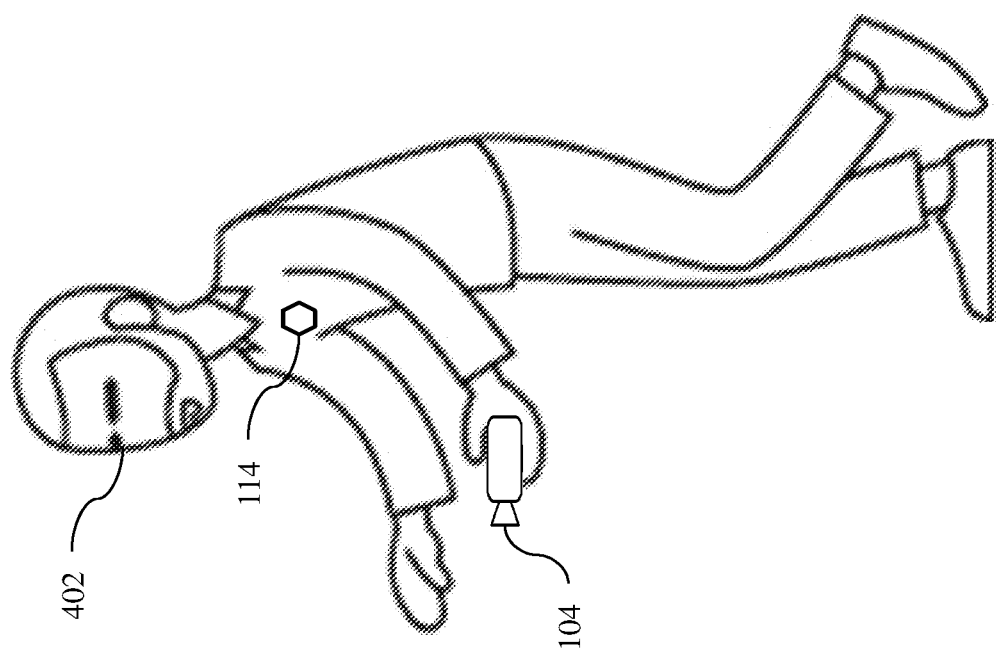
FIG. 4 depicts one embodiment of how a worn camera and a held camera can be operated by a user.

FIG. 4 illustrates a system or platform of inventive subject matter is used to coordinate worn camera 114 and held camera 104. As used in this application, range of focus for the worn camera 114 is different from that for wearer's eye 402, such that the wearer can receive more detailed information of an object.

Worn camera 114 can use any imaging technologies known in the art. In some embodiments, worn camera 114 is a conventional camera that captures images within the visible wavelengths for humans.

In other embodiments, worn camera 114 incorporates advanced imaging technologies. For example, worn camera 114 can incorporate infrared imaging technologies to accurately detect the number of people within the environment. In another example, worn camera 114 can take multi-spectral images. In a more specific example, the wearer can install a special filter, for example a UV filter, allowing to detect the different shape and/or color of the object from those observed by eye.

Additionally, it is contemplated that the image from worn camera 114 can be processed using any image processing techniques for any image processing objectives known in the art. For example, an image of an environment from worn camera 114 can be post-processed using image processing techniques comprising anisotropic diffusion, hidden Markov models, image editing, image restoration, independent component analysis, linear filtering, neural networks, partial differential equations, pixilation, principal components analysis, self-organizing maps, and wavelets. Image processing objectives can include, but are not limited to, classification, feature extraction, multi-scale signal analysis, pattern recognition, and projection (i.e., mapping three-dimensional representations on a two-dimensional plane.

Held camera 104 can use any imaging technologies known in the art. In some embodiments, held camera 104 is a conventional camera that captures images within the visible wavelengths for humans.

In other embodiments, held camera 104, like worn camera 114, incorporates advanced imaging technologies. For example, held camera 104 can incorporate infrared imaging technologies to detect whether or not an object that held camera 104 is pointed at produces heat to determine whether the object has active electronic circuitry. In another example, held camera 104 can take multi-spectral images. In yet another example, a wearer of held camera 104 can install a special filter, for example a UV filter, allowing held camera 104 to detect a different shape and/or color of an object from those observed by eye.

As with worn camera 114, held camera 104 can use any image processing techniques known in the art to further extract relevant information out of one or more images.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of engaging a viewer in augmented reality using; a first electronic device including a first camera and a display, a second electronic device including a second camera, the method comprising:
   receiving a viewer interest parameter;
   receiving a first image from the first camera;
   identifying a visual reference falling within the viewer interest parameter;
   receiving a second image from the second camera, wherein the second camera is configured to focus on the visual reference;
   determining a context of the second image within the context of the first image;
   displaying the first image, wherein the first image includes a superimposed interactive element;
   receiving a user selection of the superimposed interactive element,
   displaying the second image and the context of the second image within a context of the first image via the display of the first electronic device.

2. The method of claim 1, wherein the second image and the context of the second image are composited into the first image.

3. The method of claim 2, wherein the contextual significance of the second image comprises a superimposition of context data on the first image.

4. The method of claim 1, further comprising a memory, wherein the memory is configured to perform the steps of:

storing the second image and the context of the second image for a predetermined time period;

receiving a request to view the second image and the context of the second image within the predetermined time period; and superimposing the second image and the context of the second image onto the first image via the display of the first electronic device.

5. The method of claim 4, wherein superimposing the second image and the context of the second image is rendered in substantially real-time.

6. The method of claim 4, further comprising the step of saving a superimposed image to a persistent storage medium for later retrieval.

7. The method of claim 4, wherein the memory is a looping memory.

\* \* \* \* \*